Jan. 16, 1923.                                                                                         1,442,562
                                     W. E. FERGUSON.
            TRACTOR ATTACHMENT FOR USING DIGGING TOOLS AT ITS SIDE.
                                    FILED FEB. 23, 1921.                          2 SHEETS-SHEET 1
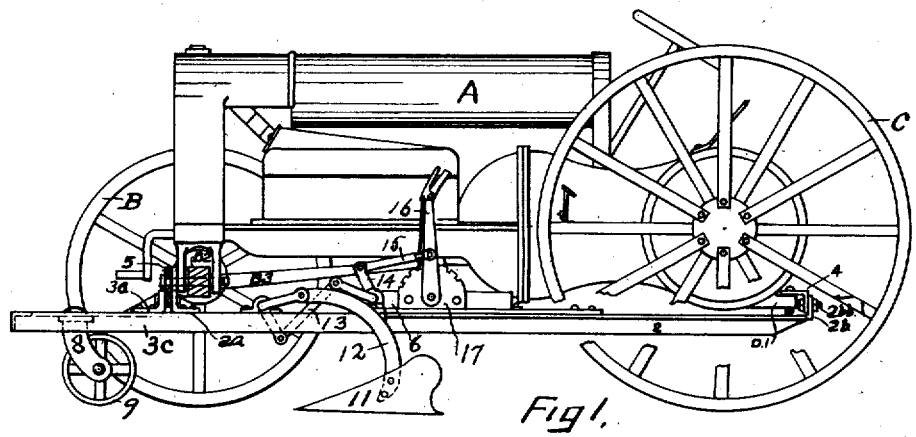
INVENTOR
William E. Ferguson
BY
Francis C. Huebner,
ATTORNEY Jan. 16, 1923.

W. E. FERGUSON.
TRACTOR ATTACHMENT FOR USING DIGGING TOOLS AT ITS SIDE.
FILED FEB. 23, 1921.

1,442,562

2 SHEETS-SHEET 2

INVENTOR
William E. Ferguson
BY
Francis C. Huebner
ATTORNEY

Patented Jan. 16, 1923.

1,442,562

UNITED STATES PATENT OFFICE.

WILLIAM E. FERGUSON, OF ORANGE COVE, CALIFORNIA.

TRACTOR ATTACHMENT FOR USING DIGGING TOOLS AT ITS SIDE.

Application filed February 23, 1921. Serial No. 447,227.

*To all whom it may concern:*

Be it known that I, WILLIAM E. FERGUSON, a citizen of the United States, and resident of Orange Cove, in the county of Fresno and the State of California, have invented a new and useful Improvement in a Tractor Attachment for Using Digging Tools at Its Side, of which the following is a specification.

My invention relates to an attachment for a tractor, and more particularly to an attachment for pulling a plow or digging tool at the side of the tractor. It is well known that at present the method used is to attach the plow to the rear of the tractor. The value of an attachment of this kind is for the purpose of plowing in an orchard or vineyard close to the vines while the tractor is running approximately midway between the rows of vines. Other objects will hereinafter appear in this specification.

Figure 3:
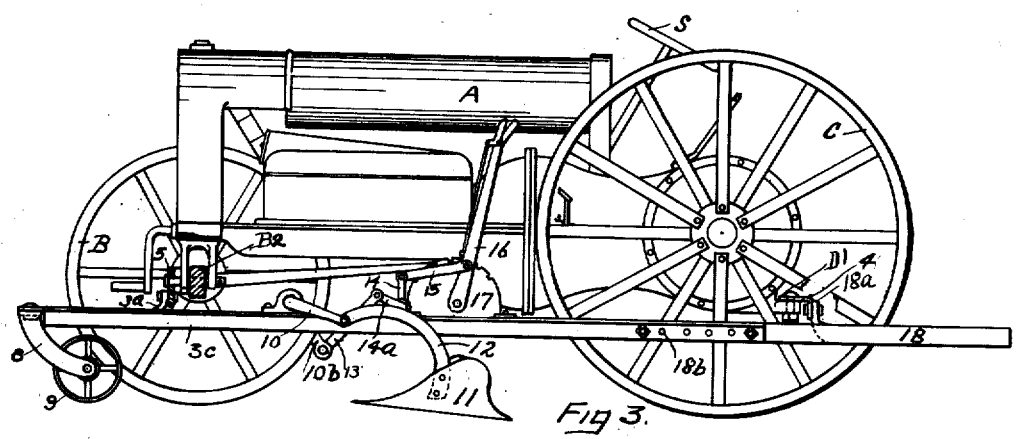
Figure 4:
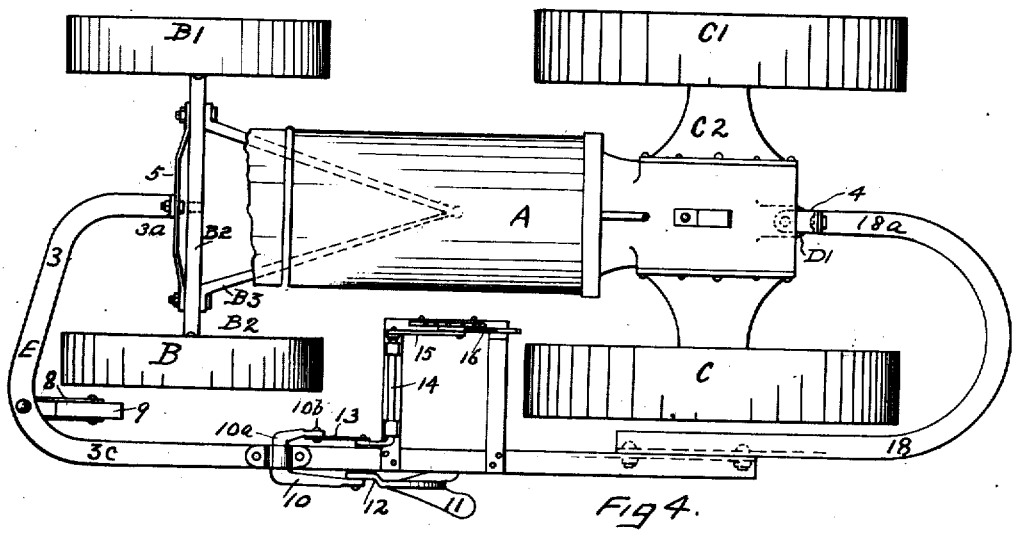

I accomplish these objects by means of the device hereinafter described and illustrated in the accompanying drawings in which Figure 1 is a side view of the device as used on a Fordson tractor. Figure 2 is a top view of the device shown in Figure 1 with parts of the tractor body cut away to show the arrangement of the frame of the attachment. Figure 3 is a side view of a modified form of attachment used on other forms of tractors. Figure 4 is a top view of the form of attachment shown in Figure 3. In said drawings B and B¹ are front wheels of a tractor. B² is an axle carrying the front wheels. C and C¹ are the rear, or drive wheels of the tractor, C² is the housing which connects the rear wheels. A is the body of the tractor which is carried on the front and rear axles in the usual manner. D is the regular form of draw bar which is attached to the under side of a tractor. D¹ is the hitch, or tail piece of the draw bar which has a plurality of holes therethrough. This hitch can be substituted by any of the well known means for attaching or pivoting two bars together. E is a frame, forming the base of the attachment which is the subject of my invention. It consists of a rigid strap 2 which has each end bent at right angles to the main portion of the strap. 4 is a right angle support attached to the hitch D¹, a portion of said support extending downward. 5 is a support attached to the front axle of B², so that it extends downward parallel with the depending portion of support 4. The end 2ª of strap 2 is pivoted to support 5 and the end 2ᵇ is pivoted to support 4. 3 is a U shaped truss which can be constructed in other forms than as shown in the drawing, the main purpose of this truss being to have a right angle extension 3ª which is pivoted to the support 5 with the same bolt or pivot which attaches end 2ª to said support 5. This truss extends from the support 5 around the front wheel of the tractor and a portion 3ᶜ thereof extends backward approximately parallel with strap 2, to a point on the line between the front and the rear wheels of the tractor. 6 is a cross support which connects truss 3ᶜ with strap 2. 7 is a brace which rigidly connects cross support 6 with strap 2, its purpose being to make the frame E rigid. It will be noted that by this construction the entire frame E can be raised and lowered by said frame swinging on the pivot 2ᵃᵃ, which passes through the extensions 2ª and 3ª and support 5, and pivot 2ᵇᵇ, which connects extension 2ᵇ with the support 4. In order to limit the distance the frame E can drop, I have attached a swivel post 8 to the frame E near the front end thereof, and have journaled a castor or wheel 9 thereon as shown in the drawings. 10 and 10ᵇ are two cranks connected to a shaft 10ª. Shaft 10ª is journaled on the truss 3ᶜ. On crank 10 I have pivoted a plow beam 12 which is attached to a plow 11. To crank 10ᵇ I have pivoted an arm 13 which is also pivoted to a double crank lever 14. 15 is a connecting arm extending from a crank on double crank lever 14 to a hand lever 16, by the movements of which the plow can be raised or lowered. 17 is a ratchet adapted for locking lever 16 in a plurality of positions. In Figures 3 and 4 I have shown a modified form of the frame E which is designated as frame E². The differences between the two forms of construction are that the extension 3ª is pivoted to the support 5, the portion 3ᶜ shown in Figures 1 and 2 is lengthened. The strap 2 and cross support 6 are dispensed with, and a curved member 18 is substituted. The curved member 18 has an inturned end 18ª which is pivoted to support 4, and the end of curved support 18 opposite said upturned end is bolted to the truss portion 3ᶜ. For the purpose of adjustment as to the length of the frame E², I have placed a plurality of holes 18ᵇ through the portion 3ᶜ and the curved member 18, some of said holes registering at different fixed adjustments. The manner of raising and lowering the plow is the same in Figures 3 and 4 as in Figures 1 and 2. B³ are front axle braces. S is the steering wheel on the tractor.

Having described my invention I claim as new and ask for Letters Patent:

1. A side hitch for a tractor consisting of a frame adapted to extend along one side of the tractor, having arms at each end bent so that the end of one of said arms can be pivoted to the front end of the tractor and the end of the other arm pivoted to the rear end of the tractor, said pivots permitting a vertical movement of the frame, means for holding the frame a predetermined distance from the earth consisting of a wheel attached to a support depending from said frame, means attached to the frame for supporting an earth working tool, and hand means for raising and lowering said earth working tool, substantially as described and for the purposes set forth.

2. A side hitch for a tractor consisting of a support pivoted to the body of the tractor, the pivoting means permitting the support to have a vertical movement, said support being constructed to extend beyond the side of the tractor, braces adapted to strengthen the support, means on said support for holding an earth working tool beyond the side of the tractor, and hand means for raising and lowering the earth working tool, substantially as described.

3. A side hitch for a tractor consisting of an arm pivoted to the rear of the tractor and an arm pivoted to the front of the tractor, the pivots permitting the arms to be raised and lowered, said arms being bent around the front wheel and the rear wheel of the tractor and joined, means on either of said arms for holding an earth digging tool beyond the side of the tractor, means for raising and lowering the earth digging tool, and means for limiting the downward movement of the arms consisting of a wheel attached to a post swiveled to the frame, substantially as described.

WILLIAM E. FERGUSON.